Patented Aug. 13, 1940

2,211,629

UNITED STATES PATENT OFFICE 2,211,629

AGE RESISTOR

Winfield Scott, Akron, Ohio, assignor to Wingfoot Corporation, Wilmington, Del., a corporation of Delaware No Drawing. Application July 9, 1936,
Serial No. 89,767

13 Claims. (Cl. 260—809)

This invention relates to new compositions of matter and to their use as preservatives for rubber and other deteriorable materials.

It is found that certain terpene ketones may be condensed with amines to yield terpene ketone anils which are useful as age resistors in rubber hydrocarbons subject to deterioration. The new compositions may also have value as pharmaceuticals. The particular terpene ketones which may be employed to yield the compounds of the invention are those having not more than 16 hydrogen atoms in the molecule and the amines reacted therewith are the aryl and aralkyl amines having not less than 7 carbon atoms in the molecule. Aromatic amines having less than this number of carbon atoms, such as aniline, give rise to anils which have no antioxidant power in rubber and, hence, are not desired.

An example of a condensation product coming within the scope of the invention is that resulting from the interaction of camphor and alpha naphthylamine. Other terpene ketones which may be used are fenchone, pulegone, carvone and dihydro carvone. Among the aryl and aralkyl amines which react with the foregoing terpene ketones, and others, to produce anils may be mentioned toluidine, xylidine, anisidine, para phenetidine, para phenylene diamine, p-p' diamino diphenyl methane, alpha naphthylamine, beta naphthoylamine and benzyl amine, p-amino dimethyl aniline, amino diphenyl, amino diphenyl oxide, amino diphenylamine, AR tetrahydro alpha naphthylamine, AR tetrahydro beta naphthylamine, amino carbazole, benzidine, p-amino phenol and phenyl hydrazine. Of course, other aromatic amines can also be employed and may be condensed with any of the tertiary ketones mentioned or other terpene ketones of the class defined.

Any suitable method of preparation may be employed for preparing the anils but the following examples illustrate methods which have been found to be satisfactory.

Example 1

One mol of camphor is heated with one mol of para phenetidine in the presence of one gram of iodine as a catalyst. The reaction is carried out at atmospheric pressure and a final temperature of 245° C. is reached, the heat being applied at such a rate that neither the camphor nor the phenetidine is distilled off in any appreciable quantity. Practically the calculated amount of water produced by the condensation is collected and completion of the reaction is indicated when water ceases to be given off. The crude product is next distilled under reduced pressure and the fraction coming over between 150° and 174° C. under a pressure of 4–5 mm. is retained as the anil. Further purification can be effected, if desired, by crystallizing from dilute alcohol (85 parts alcohol and 15 parts water by volume), the camphor-p-ethoxy anil being obtained as white needles melting at 71° to 71.5° C. Nitrogen by analysis was found to be 5.38% as against 5.16% calculated for $C_{18}H_{25}ON$. The product probably has the formula

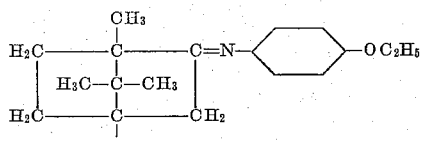

Example 2

Another anil of the type defined is prepared by reacting 167 parts of camphor and 54 parts of para phenylene diamine with one part of iodine as a catalyst. The mixture is heated and water is given off rapidly at 180–190° C., the final temperature being 235° C. and the time of reaction five or six hours. The crude material solidifies to a hard crystalline mass upon cooling and is triturated with cold alcohol to remove soluble impurities. After several crystallizations from hot alcohol, the product is obtained as white needles melting at 196° C. Analysis showed 7.45% of nitrogen, while the calculated value for N-N'-di-2-camphanylidene para phenylene diamine ($C_{26}H_{36}N_2$) is 7.44%. The formula is considered, therefore, to be:

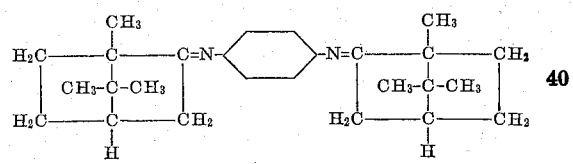

Example 3

Camphor alpha naphthil is prepared in a manner similar to that set forth in the preceding examples, camphor and alpha naphthyl amine being heated in the presence of a catalyst, such as iodine, hydriodic acid, zinc chloride, etc. The product is purified by distillation to separate the small amount of di-alpha-naphthylamine which is also formed in the reaction. The naphthil crystallizes from alcohol in needles melting at 99° C.

Example 4

Camphor beta naphthil is prepared in the same way as the alpha naphthil, beta naphthylamine being substituted for the alpha naphthylamine. The product crystallizes from alcohol in the form of colorless needles melting at 77° C.

Other terpene anils which may be formed in the same way as the foregoing are N-N'-di-camphanylidene-4-4'-diamino diphenyl methane, fenchone toluil, fenchone anisil, fenchone alpha and beta naphthils, pulegone toluil, pulegone alpha and beta naphthil, carvone-p-ethoxy anil, carvone alpha naphthil, carvone beta naphthil, etc.

The class of anils described may be adapted to various uses, including treatment of rubber and as pharmaceuticals, and data is here given to show their utility as preservatives for rubber. In carrying out these tests, the various anils were incorporated into a rubber stock having otherwise poor age resistance. Samples of the stock were then subjected to high temperature ageing in an air bomb at a temperature of 114° C. and a pressure of 80 pounds per square inch for a period of 7 hours. The tensile strength of the aged sample was then compared with the tensile strength of the same sample before ageing and the ratio thus obtained tabulated, as shown below.

| Compound | High temp. tens. ratio |
|---|---|
| Camphor alpha naphthil | 61 |
| Camphor-p-ethoxy anil | 56 |
| Camphor beta naphthil | 59 |
| Camphor+4-4' diamino diphenyl methane | 40 |
| Camphor+p-phenylene diamine | 45 |

It will be noted that a considerable proportion of the tensile strength remained after high temperature ageing, this test being extremely severe and tending to reduce the rubber to a shapeless resinous mass when no antioxidant is employed. It will be understood that the terpene anils described may also be used as preservatives for other unsaturated organic materials subject to deterioration, such as gasoline, vegetable oils and the like.

While preferred embodiments of the invention have been described above, it will be obvious that the invention includes a large number of compositions and is not limited to the specific details herein set forth. It is intended, accordingly, that the patent shall cover, by suitable expression in the appended claims, all features of patentable novelty residing in such invention.

What I claim is:

1. A method of preserving rubber which comprises treating the same with a terpene-ketone-anil in which the terpene radical contains not more than sixteen hydrogen atoms and the anil radical contains not less than seven carbon atoms.

2. A method of preserving rubber which comprises treating the same with a terpene-ketone-anil having the formula $C_{10}H_{16}=NR$, in which R is a hydrocarbon radical containing at least seven carbon atoms including an aromatic ring.

3. A method of preserving rubber which comprises treating the same with a terpene-ketone-anil having the formula $C_{10}H_{16}=NR$, in which R is an aromatic radical of the substituted benzene series or of the naphthalene series containing at least seven carbon atoms.

4. A method of preserving rubber which comprises treating the same with a terpene-ketone-anil having the formula $C_{10}H_{16}=NR$, in which R is a naphthyl radical.

5. A method of preserving rubber which comprises treating the same with a terpene-ketone-anil having the formula $C_{10}H_{16}=NR$, in which R is a substituted phenyl radical containing at least seven carbon atoms.

6. A method of preserving rubber which comprises treating the same with a camphor-anil in which the aromatic radical contains at least seven carbon atoms.

7. An age resisting rubber composition comprising rubber and a terpene-ketone-anil in which the terpene radical contains not more than sixteen hydrogen atoms and the anil radical contains not less than seven carbon atoms.

8. An age resisting rubber composition comprising rubber and a terpene-ketone-anil having the formula $C_{10}H_{16}=NR$, in which R is an aromatic radical of the substituted benzene series or of the naphthalene series containing at least seven carbon atoms.

9. An age-resisting rubber composition comprising rubber and a camphor-anil in which the anil radical contains at least seven carbon atoms.

10. A method of preserving rubber which comprises treating the same with a camphor-naphthil.

11. A method of preserving rubber which comprises treating the same with camphor-beta-naphthil.

12. A method of preserving rubber which comprises treating the same with N-N'-dicamphanylidene-4-4'-diamino diphenyl methane.

13. A method of preserving rubber which comprises treating the same with camphor-p-ethoxy anil.

WINFIELD SCOTT.

CERTIFICATE OF CORRECTION.

Patent No. 2,211,629.                                                August 13, 1940.

WINFIELD SCOTT.

It is hereby certified that error appears in the printed specification of the above numbered patent requiring correction as follows: Page 1, first column, line 30, for "naphthoylamine" read --naphthylamine--; page 2, second column, lines 16 and 17, claim 3, and lines 40 and 41, claim 8, strike out the words "containing at least seven carbon atoms" and insert the same after "series" in line 16 first occurrence and line 39 respectively, same claims; and that the said Letters Patent should be read with this correction therein that the same may conform to the record of the case in the Patent Office.

Signed and sealed this 1st day of October, A. D. 1940.

Henry Van Arsdale,
Acting Commissioner of Patents.

(Seal)